March 24, 1953 W. P. OEHLER ET AL 2,632,291
DISK HARROW HITCH
Filed Sept. 27, 1946 2 SHEETS—SHEET 1
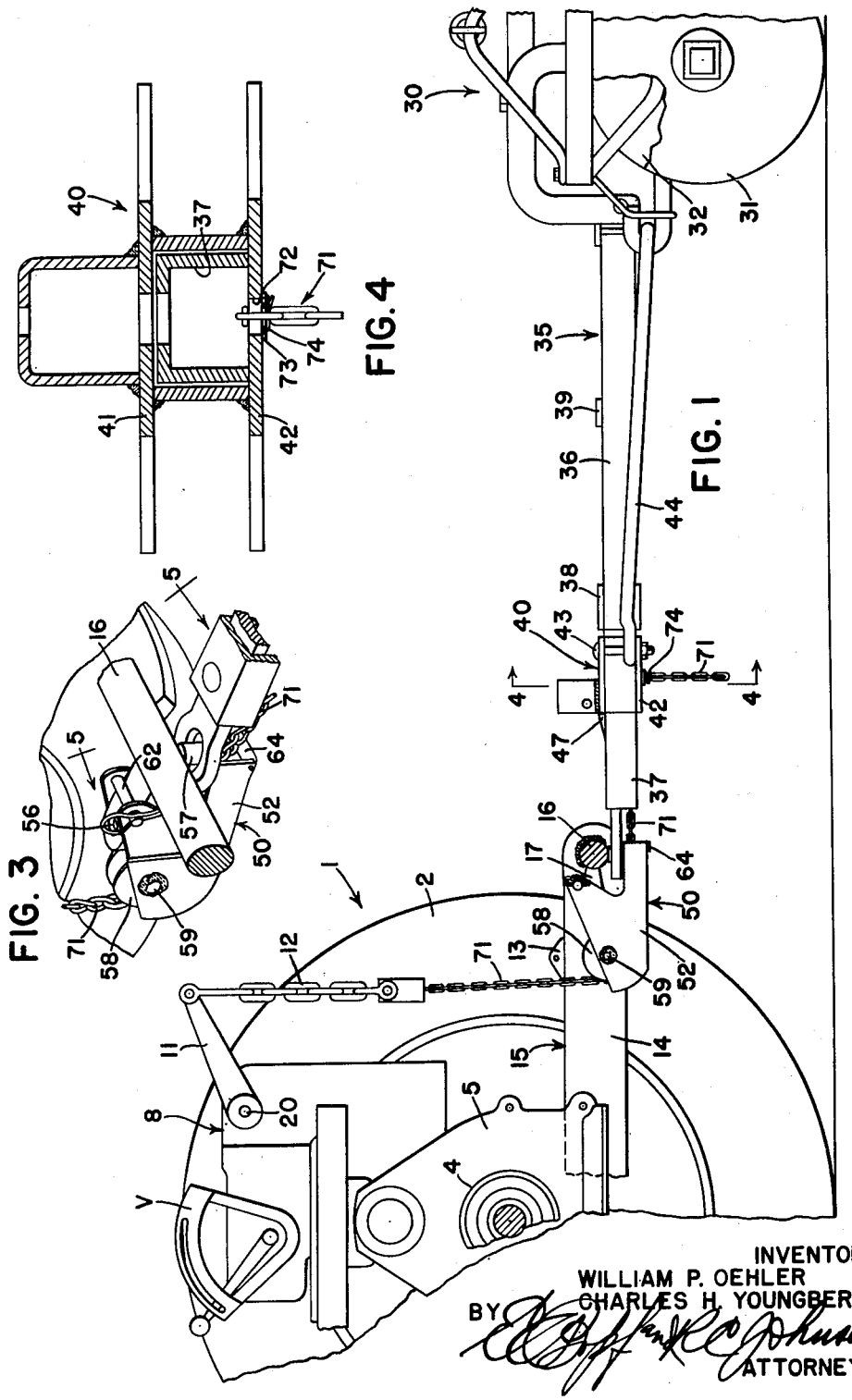
INVENTORS
WILLIAM P. OEHLER
CHARLES H. YOUNGBERG
BY
ATTORNEYS

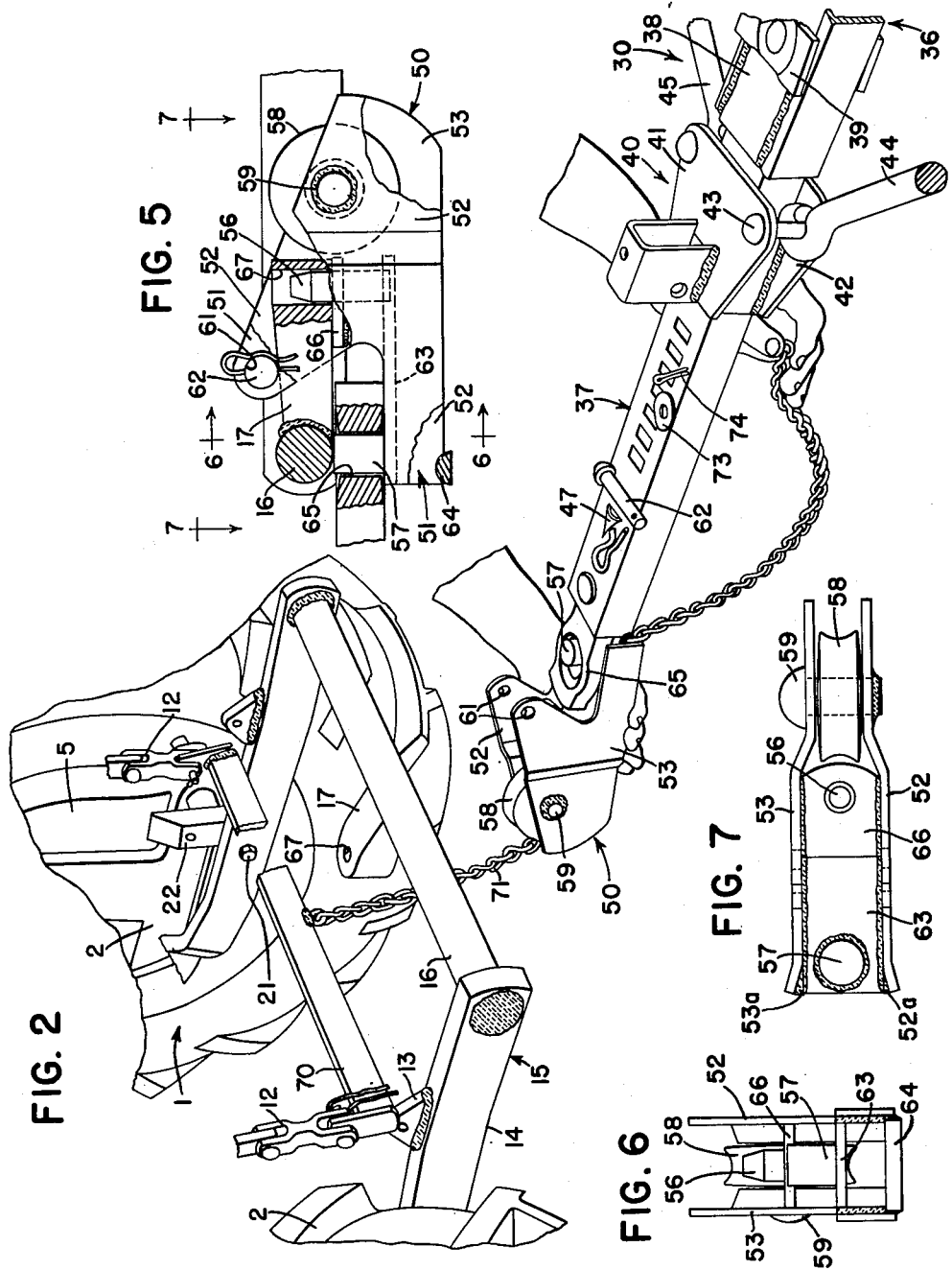

Patented Mar. 24, 1953

2,632,291

UNITED STATES PATENT OFFICE 2,632,291

DISK HARROW HITCH

William P. Oehler and Charles H. Youngberg, Moline, Ill., assignors to Deere & Company, Moline, Ill., a corporation of Illinois Application September 27, 1946, Serial No. 699,916

13 Claims. (Cl. 55—81)

The present invention relates generally to agricultural implements and more particularly to tractor propelled implements of the soil working type.

The object and general nature of the present invention is the provision of a tractor propelled implement having new and improved means for controlling the tool or tools of the implement by power from the tractor. A further feature of this invention is the provision of new and improved quick detachable hitch means which not only serves to easily and quickly connect the implement with the tractor but also serves as means for supporting in the proper position the connection between the implement tool or tools and the power lift unit.

These and other objects and advantages of the present invention will be apparent to those skilled in the art after a consideration of the following detailed description, taken in conjunction with the accompanying drawings, in which:

Figure 1 is a side view of a tractor propelled disk harrow outfit in which the principles of the present invention have been incorporated;

Figure 2 is a fragmentary perspective view showing the disk harrow in the process of being hitched to the drawbar of the tractor and the latter as fixed to the axle housings so that the flexible angling element of the harrow angling means can be connected with the power lift arms of the tractor;

Figure 3 is a perspective similar to Figure 2, showing the hitch and associated parts in the position they occupy after hitch to connection has been effected;

Figure 4 is a sectional view taken generally along the line 4—4 of Figure 1;

Figure 5 is a side view, taken generally along the line 5—5 of Figure 3, showing the details of the power control roller bracket in side elevation;

Figure 6 is a view taken generally along the line 6—6 of Figure 5; and

Figure 7 is a plan view of the power control roller bracket, taken generally along the line 7—7 of Figure 5.

Referring now to the drawings, the reference numeral 1 indicates a farm tractor of the four wheel type, having front wheels (not shown) and rear wheels 2 journaled for rotation in a rear axle structure 4 which includes a pair of drop housings 5. The tractor also includes a power plant and a power lift unit 8 of the hydraulic type, including suitable valve mechanism V and other necessary parts, such as a pair of lift arms 11 and links 12 ordinarily connecting the arms 11 to lugs 13 formed on the side members 14 of a generally vertically swingable tractor drawbar or bail member 15. The latter is preferably in the form of a U-shaped member, considered as a whole, and includes a rear transverse section 16 which may be formed of round stock having a forwardly extending generally centrally mounted apertured attaching lug 17. The sides 14 may be box members or the like and are pivoted at their front ends to the forward portion of the drop housings 5. Preferably, the rear transverse part 16 is welded or otherwise permanently secured to the side portions 14 of the tractor drawbar or bail 15. The two power lift arms 11 are clamped or otherwise fixed in any suitable manner to the ends of a power lift rockshaft 20 which forms a part of the hydraulic unit 8.

Normally, the links 12 are connected to the lugs 13 so that operating the power lift unit will cause the arms 11 to raise or lower the tractor drawbar 15. If desired, however, the drawbar 15 may be locked stationarily to the tractor, as by inserting pins 21 through the drawbar sides 14 and into openings in lugs 22 fixed to the drop housings 5 in any suitable manner. In this way, the tractor drawbar 15 becomes a rigid part of the tractor and the power lift unit 8 may then be utilized for other service.

According to the principles of the present invention we provide a new and improved hitch for an implement such as a disk harrow in which the disk harrow gangs are arranged to be angled and straightened under the control of the power lift unit 8 of the tractor.

The disk harrow implement is indicated in its entirety by the reference numeral 30 and includes a left hand gang of disks, indicated at 31, and a right hand gang of disks, indicated at 32, each including a pair of inner and outer bearings, the inner bearings being connected to the rear end of a drawbar structure 35 which consists of an outer member 36, to which the inner bearings are connected directly, and a forward or inner member 37 telescopically associated with the outer member 36, being limited in its outward movement relative thereto by suitable stop plates 38 and 39 forming a part of the telescopically associated drawbar members. A slide 40 is mounted for fore and aft movement on the forward drawbar member 37 and comprises upper and lower plates 41 and 42 having rearward apertured sections receiving pins 43 by which the forward ends of a pair of links 44 and 45 are connected thereto. The rear ends of the links 44 and 45 are connected to the outer bearings of the disk gangs 31 and 32, whereby when the slide 40 is shifted forwardly, as up against a stop 47 on the drawbar member 37, the gangs 31 and 32 are brought into an angled position, and when the slide 40 is permitted to drop back, as against the stop plates 38 or the forward end of the rearward drawbar member 36, the gangs 31 and 32 are in their straightened or transport position.

In order to effect the above mentioned shifting of the gangs between angled and transport position by the power of the tractor, we provide a hitch member 50 which is adapted to be detachably mounted on the tractor drawbar lug 17. The member 50 includes a lower tubular section 51, a pair of side sections 52 and 53, and a pair of studs 56 and 57 together with a roller 58 which is mounted for rotation in a generally vertical plane on a shaft or bolt 59. The tubular section 51 is formed by the lower portions of the sides 52 and 53, a central spacing plate 63 and a chain supporting cross bar 64. The side sections 52 and 53 are apertured, as at 61, to receive a quick detachable pin 62 for locking the member 50 in position on the lug 17. The forward end of the disk harrow drawbar member 37 is provided with an apertured end 65 which is adapted to be placed over the stud 57, and the stud 56 is adapted to be inserted into the aperture 67 in the lug 17, after which the quick detachable pin 62 may be passed into the openings 61, whereby the member 50 is thus locked to the tractor drawbar. The stud 56 is carried on an upper spacing plate 66 to which the sides 52 and 53 are welded, and the stud 57 is carried by the longer spacing plate 63, to which the sides 52 and 53 are also welded. The side members 52 and 53 are flared, as at 52a and 53a, in order to facilitate lateral swinging of the harrow drawbar structure about the stud 57 as a center.

Either before or after the member 50 is mounted as just described above, the tractor power lift links 12 are disconnected from the lugs 13 and connected to a transverse bar 70, preferably by the same pins that usually connect the lower ends of the links 12 to the tractor drawbar arms 14. The tractor drawbar or bail member 15 is then locked against vertical displacement by the pins 21. A chain 71 extends downwardly from the cross bar 70 and is trained over the forward roller 58 and extended rearwardly through the tubular section 51, and at its rear end the chain 71 is connected to the lower plate 42 of the slide 40, as by being passed through an opening 72 therein and locked in place by a washer 73 and a cotter 74 or the like.

Since the member 50 is mounted, as described above, on the lug 17 of the tractor drawbar, the member 50 is thus locked to the tractor. It will be noted that the stud 57 which receives the disk harrow drawbar member 37, is disposed underneath the transverse rear section of the tractor drawbar 15 so that so long as the member 50 is held in position, the disk harrow drawbar member 37 cannot become disengaged from the lug 57.

When it is desired to bring the gangs into their working or angled position, the operator moves the power lift valve V so as to cause the arms 11 to swing upwardly. This lifts the bar 70 and pulls upwardly on the front end of the chain 71, the rearward section moving horizontally through the guide 51 and pulling forwardly on the slide 40. This movement is continued until the slide 40 strikes the stop 47, or until the desired angle is reached, whereupon the outfit is then ready for travel across the field in operating position. The disk harrow may be returned to a non-working or straightened position any time it is desired to do so, merely by operating the power lift valve to permit the arms 11 to lower, whereupon the slide 40 will drop back into a position at the rear of the drawbar member 37, permitting the outer ends of the disk gang to drop rearwardly.

Under certain conditions it may be desirable to cause the gangs to swing into their straightened or transport position, but not while the outfit is moving forwardly. In order to do this, it is merely necessary to back the tractor a relatively short distance. The stop 47 normally lies against the front edge of the slide 40 when the latter has been drawn forwardly by the power lift to place the gangs in operating position, but if it should be desired to straighten the gangs without having the outfit move forwardly, merely backing the tractor will do so, since the member 37 then telescopes rearwardly within the sides of the rear drawbar member 36 without requiring any operation of the power lift. Of course, the power lift should be released before driving forwardly again, or otherwise the forward movement of the tractor would merely draw the disk gangs into an angled position again, and if that is not desired, it is thus necessary to release the power lift before driving forwardly This is a useful feature of the present invention in that it permits the gangs to be straightened without requiring any forward travel, and is useful under such conditions where the tractor may be almost mired and forward travel under load not feasible.

The disk harrow may readily be connected to or disconnected from the tractor merely by taking off the one member 50 and disconnecting either the bar 70 from the links 12 or the rear end of the chain 71 from the slide 40, attention being specifically invited to the fact that mounting the member 50 in place automatically secures the attachment of the drawbar member 36 to the tractor drawbar, since the disk harrow drawbar 37 cannot become disengaged from the stud 57 so long as the member 50 is in position on the lug 17.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A hitch adapted to connect an implement having a part, one portion of which is adapted to be shifted relative to another portion, with a tractor having a power operated means and a drawbar of the type including a transverse member and a part extending forwardly from said member and apertured at its forward end, said member and apertured at its forward end, said hitch comprising an implement drawbar means adapted to be connected at its front end with the tractor drawbar and at its other end with said other portion of said implement part, means movable relative to said implement drawbar means and adapted to be connected with said one portion of said implement part, a flexible element connected at its rear end with said movable means, a member having a stud disposable in the aperture in said tractor drawbar part, means for holding said last mentioned member on said tractor drawbar part, a reaction member movably carried by said last mentioned member and receiving said flexible element, and means for connecting the forward portion of said flexible element with said power operated means, whereby operation of the latter serves to act through said flexible element and the associated movable means to shift said one portion of said implement part relative to the other portion.

2. A hitch adapted to connect an implement having a drawbar with an opening in the front end thereof and a part to be shifted to a tractor drawbar having a transverse member and a forwardly extending lug fixed thereto, said hitch comprising a part having a stud adapted to receive the opening in said implement drawbar, a roller journaled on the forward portion of said part, a connection adapted to be trained over said roller and to extend rearwardly to said shiftable implement part, and means carried by said hitch part and engageable with said lug for holding said hitch part on the tractor drawbar.

3. A hitch adapted to connect an implement having a drawbar with an opening in the front end thereof and a part to be shifted to a tractor drawbar having a transverse member and a forwardly extending apertured lug fixed thereto, said hitch comprising a part having a pair of longitudinally spaced studs, one adapted to receive said implement drawbar, and the other adapted to receive said drawbar lug, a roller journaled on the forward portion of said part, a connection adapted to be trained over said roller and to extend rearwardly to said shiftable implement part, and means for holding said hitch part on the tractor drawbar.

4. The invention set forth in claim 3, further characterized by said hitch part having laterally spaced apart portions adapted to be disposed on opposite sides of said drawbar lug, and said holding means comprising means acting against said laterally spaced apart portions and cooperating with said lug for holding said hitch part on said tractor drawbar.

5. The combination with a tractor having a generally vertically swingable bail member provided with a generally central lug and means on the tractor for swinging said bail member detachably connected with the latter, of a flexible connection adapted to be connected with said means when the latter is disconnected from the tractor bail member, a combined implement hitch member and support for said flexible connection, comprising means to receive said lug and means to receive and support said flexible connection, and means engageable with said lug and connectible with said combined hitch member for detachably mounting said combined hitch member and support on said lug.

6. A hitch device for connecting a disk harrow having a drawbar and slide thereon to a tractor having a power lift unit and a drawbar disposed generally below said unit, said hitch device comprising a member having a part adapted to detachably receive said harrow drawbar, means for detachably connecting said member to the tractor drawbar in a position thereon such that said drawbar-receiving part lies adjacent said tractor drawbar, whereby as long as said member is connected to said tractor drawbar, the harrow drawbar is maintained in connected relation therewith, and a connection extending from said slide to said power lift unit.

7. A disk harrow adapted to be connected with a tractor and comprising a pair of gangs movably connected for generally horizontal swinging movement into and out of an angled working position, a drawbar construction comprising a longitudinally shiftable member adapted to be connected to the tractor to receive draft therefrom and a second member connected with the gangs and receiving said shiftable member, a part shiftable along said shiftable drawbar member and connected with said gangs for changing the angle thereof, power means carried by the tractor and acting against said shiftable part for moving said gangs into an angled working position, and means acting between said longitudinally shiftable drawbar member and said shiftable part whereby rearward movement of the longitudinally shiftable drawbar member, as by backing the tractor, forces said gangs into a straightened position.

8. A disk harrow adapted to be connected to a tractor having a generally vertically swingable drawbar, power actuated means detachably connected with said drawbar, and means for locking the latter to the tractor for holding the drawbar against generally vertical swinging when the power actuated means is disconnected from the drawbar, said disk harrow comprising frame means, a disk gang one end portion of which is pivotally connected with said frame means, means for hitching the latter to said drawbar when it is fixed to the tractor, and means connecting the other end portion of said gang to said power actuated means, when the latter is disconnected from the drawbar, for swinging said gang into different positions by the operation of said power actuated means.

9. The invention set forth in claim 8, further characterized by said roller being journaled in a position on the forward portion of said part so as to lie at least partially below and in front of said apertured lug when said hitch part is connected thereto.

10. A hitch adapted to connect an implement, having a draft bar with an opening in the front end thereof and a part to be shifted, to a tractor having a drawbar including a transverse member carrying an apertured portion, said hitch comprising a member having a pair of longitudinally spaced studs, one adapted to be disposed in the aperture in said tractor drawbar member and the other adapted to receive the front end of said implement draft bar, a roller journaled on the forward portion of said member, a flexible connection adapted to be trained over said roller and to extend rearwardly to said shiftable implement part, said tractor having means to receive the front portion of said flexible connection, and means for holding said hitch member on said tractor drawbar.

11. The invention set forth in claim 10, further characterized by said holding means comprising a pair of spaced apart portions embracing the apertured portion of said tractor drawbar, and means carried by said spaced apart portions for fixedly connecting said hitch member to said tractor drawbar.

12. The invention set forth in claim 11, further characterized by said laterally spaced apart portions being apertured and said holding means including a pin removably disposable in said openings and engageable with the apertured portion of said tractor drawbar for holding said hitch member thereto.

13. The invention set forth in claim 11, further characterized by said roller being disposed forwardly of said laterally spaced apart drawbar-embracing portions.

WILLIAM P. OEHLER.
CHARLES H. YOUNGBERG.

REFERENCES CITED

The following references are of record in the file of this patent:

UNITED STATES PATENTS

| Number | Name | Date |
|---|---|---|
| 1,807,379 | Burrows | May 26, 1931 |
| 2,114,049 | Espe | Apr. 12, 1938 |
| 2,264,783 | White | Dec. 2, 1941 |
| 2,285,550 | Woods | June 9, 1942 |
| 2,337,801 | Cook | Dec. 28, 1943 |
| 2,351,168 | Warne | June 13, 1944 |
| 2,392,018 | White | Jan. 1, 1946 |
| 2,476,439 | Court | July 19, 1949 |